(12) United States Patent
Takada et al.

(10) Patent No.: US 8,801,262 B2
(45) Date of Patent: Aug. 12, 2014

(54) SPREAD ILLUMINATING APPARATUS

(71) Applicant: Minebea Co., Ltd., Nagano (JP)

(72) Inventors: Shohei Takada, Hamamatsu (JP); Tomotaka Horikawa, Fukuroi (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 13/916,096

(22) Filed: Jun. 12, 2013

(65) Prior Publication Data

US 2014/0003092 A1    Jan. 2, 2014

(30) Foreign Application Priority Data

Jun. 29, 2012    (JP) ................................. 2012-146971

(51) Int. Cl.
F21V 7/00    (2006.01)
(52) U.S. Cl.
USPC .......................................... 362/623; 362/632
(58) Field of Classification Search
USPC .................... 362/623, 624, 628, 632–634, 362/97.1–97.4; 349/58, 60, 65
See application file for complete search history.

(56) References Cited

U.S. PATENT DOCUMENTS

| 7,195,392 | B2 * | 3/2007 | Shiau | 362/633 |
| 7,202,921 | B2 * | 4/2007 | Chen | 349/65 |
| 2007/0002591 | A1 * | 1/2007 | Chang et al. | 362/633 |
| 2008/0291697 | A1 * | 11/2008 | Sun | 362/628 |

FOREIGN PATENT DOCUMENTS

JP    A-2005-302485    10/2005

* cited by examiner

*Primary Examiner* — Thomas Sember
(74) *Attorney, Agent, or Firm* — Oliff PLC

(57) ABSTRACT

A spread illuminating apparatus includes: a light guide plate having protrusions on side surfaces of the light guide plate, a housing frame having recesses in which the protrusions of the light guide plate are introduced, a reflecting sheet arranged on a bottom surface side opposing an emitting surface of the light guide plate, and a fixation device for fixing the reflecting sheet to a bottom surface of the housing frame. The recesses of the housing frame include a first recess which is formed to be opened at a bottom surface side and is at least partially covered by the fixation device, and each of the protrusions to be arranged at the first recess has an opposing surface that opposes the fixation device, and the opposing surface is provided with clearance relative to the fixation device.

6 Claims, 4 Drawing Sheets

SPREAD ILLUMINATING APPARATUS

BACKGROUND OF THE INVENTION

1. Field of the Invention

The present invention relates to a spread illuminating apparatus, and in particular a spread illuminating apparatus having a structure in which a light guide plate is housed in a housing frame.

2. Description of the Related Art

Currently, a sidelight-type spread illuminating apparatus is widely used as a backlight for liquid crystal display devices. This type of spread illuminating apparatus includes a light guide plate having a principal surface that is approximately the same size as a screen and a light source arranged on a side end surface of the light guide plate. By emitting light which has entered from the side end surface of the light guide plate from one of the principal surfaces, the screen can be uniformly illuminated. Such a spread illuminating apparatus often has a structure in which the light guide plate (and other constituent elements such as the light source and the like) is housed in a housing frame (refer to, for example, JP 2005-302485 A).

In many cases, such a spread illuminating apparatus is structured as follows: protrusions are provided on side surfaces of the light guide plate, and recesses are provided on side walls of the housing frame into which the protrusions are disposed, and when housing the light guide plate in the housing frame and disposing the protrusions of the light guide plate into the corresponding recesses, the light guide plate is positioned relative to the housing frame. Conventionally, since protrusions function as positioning and are provided on the side surfaces of the light guide plate, the bottom surfaces of the protrusions are usually made approximately flush with the bottom surface of the light guide plate.

FIG. 5 is a breakdown perspective view illustrating the spread illuminating apparatus disclosed in JP 2005-302485 exemplifying the structure of a conventional spread illuminating apparatus.

The spread illuminating apparatus M shown in FIG. 5 is used as a backlight of a liquid crystal panel N, and includes a light guide plate 101, point light sources 102, a reflecting sheet 103, a diffusing sheet 104, prism sheets 105 and 106, and a frame-shaped housing frame 107 in which these members are housed. The light guide plate 101 has an approximately rectangular shape, and protrusions 111a to 111c and 112a to 112c are provided on side surfaces 111 and 112 which are orthogonal to a side surface 108 at which the point light sources 102 are arranged.

The protrusions 111a to 111c and 112a to 112c are for positioning the light guide plate 101 relative to the housing frame 107. Recesses 120a to 120c and 121a to 121c, in which the respective protrusions 111a to 111c and 112a to 112c are arranged, are formed on side walls 122 and 123 of the housing frame 107.

In the spread illuminating apparatus M, the thickness of the protrusions 111a to 111c and 112a to 112c is formed to be thinner than that of the light guide plate 101. The protrusions 111a, 111c, 112a, and 112c are formed relatively at an emitting surface 109 side in a thickness direction of the light guide plate 101, and the protrusions 111b and 112b are formed relatively at a bottom surface 110 side of the light guide plate 101. In this structure, the protrusions 111b and 112b are exemplified that a bottom surface 113 thereof is made approximately flush with the bottom surface 110 of the light guide plate 101.

In accordance with the above-described structure of the protrusions 111a to 111c and 112a to 112c, the protrusions 111a, 111c, 112a, and 112c formed relatively at the emitting surface 109 side correspond to the recesses 120a, 120c, 121a, and 121c. In this case, there are recesses opened at a top surface 122a and 123a side (the emitting surface 109 side of the light guide plate 101). On the other hand, the protrusions 111b and 112b formed relatively at the bottom surface 110 side correspond to the recesses 120b and 121b. In this case, there are recesses opened at a bottom surface 122b and 123b side (the bottom surface 110 side of the light guide plate 101).

In recent, however, since the surface area of the light guide plate for the spread illuminating apparatus is demanded to increase, and to the contrary the thickness thereof is demanded to decrease, the following problems become prominent, which are also applicable to the spread illuminating apparatus M illustrated in FIG. 5. Here, in a finished product to which a liquid crystal panel is fixed, if the finished product is subjected to periodic temperature changes, cracks or fissures may occur at the root of the protrusions whose bottom surfaces are formed to be approximately flush with the bottom surface of the light guide plate (protrusions 111b and 112b in the example shown in FIG. 5) among the protrusions provided on the side surfaces of the light guide plate.

Cracks or fissures in the protrusions are not only undesirable in the structural stability of the spread illuminating apparatus, but may lead to uniformity losses in brightness of light emitted from the light guide plate thus decreasing visibility. This happens, particularly if cracks from the root of the protrusions entering toward the inside of the light guide plate extend toward the effective emitting area of the light guide plate.

Thus, based on considerable research, the present inventors identified why the problems have been caused, and thus successfully reached the present invention. Details will be discussed with reference to FIG. 6.

FIG. 6 is a partial cross-section showing the protrusion 111b portion of the spread illuminating apparatus M in an assembled state at a cross-section orthogonal to the extension direction of the side surface 111 that passes through the protrusion 111b. As shown in FIG. 6, in the spread illuminating apparatus M, the reflecting sheet 103 arranged on the bottom surface side 110 of the light guide plate 101 is normally retained on the housing frame 107 by adhering a peripheral edge thereof to the bottom surface 122b of the side wall 122 of the housing frame 107 via an adhering means such as a double-sided tape 125.

FIG. 6 shows a step into which the reflecting sheet 103 is introduced, the reflecting sheet 103 being provided between an outer edge part 122c and an inner edge part 122d of the bottom surface 122b of the side wall 122 (this step is omitted in FIG. 5). In FIG. 6, the bottom surface 113 of the protrusion 111b in the light guide plate 101 has a constant step to the bottom surface 110 of the light guide plate 101. However, this is for emphasizing the negligible small step based on the thickness of the double-sided tape 125. Thus, in actual conditions, the bottom surface 113 of the protrusion 111b is approximately flush with the bottom surface 110 of the light guide plate 101.

Normally, the double-sided tape 125 is continuously adhered without keeping off from the recesses 120a to 120c provided on the bottom surface 122b (the inner edge 122d in the case of the illustrated example) of the side wall 122. Therefore, a portion of the recess 120b which is formed to be opened at the bottom surface 122b side is covered by the double-sided tape 125, and at the same time, the double-sided tape 125 is also adhered to the bottom surface 113 of the protrusion 111b disposed in the recess 120b.

The protrusion 111b is thus restrained to the reflecting sheet 103 and the housing frame 107 via the double-sided tape 125. It was found that if the spread illuminating apparatus M is subjected to periodic temperature changes, the protrusion 111b is repeatedly subjected to stress caused by a difference in the thermal expansion coefficient of the constituent members of the spread illuminating apparatus M, and this can easily lead to cracks or fissures at the root of the protrusion 111b at which the stress is concentrated. (In fact, if the portion of the double-sided tape 125 that covers the recess 120b is intentionally removed, cracks or fissures did not occur at the root of the protrusion 111b.)

SUMMARY OF THE INVENTION

Considering the above problems, an object of the present invention is to provide a spread illuminating apparatus that has a structure in which a light guide plate is housed in a housing frame for suppressing cracks or fissures in the protrusions of the light guide plate.

The below-described embodiments exemplify constitutions of the present invention, and will be explained in an itemized manner in order to facilitate the understanding of the various constitutions of the present invention. Each item is not meant to limit the technical scope of the present invention, and substitutions or deletions of a portion of the constituent elements of each item as well as additions of other constituent elements upon referring to the detailed description of the preferred embodiments are included within the technical scope of the invention.

According to a first aspect of the present invention, there is provided a spread illuminating apparatus including a light guide plate having protrusions on side surfaces thereof, a housing frame having recesses in which the protrusions of the light guide plate are introduced, a reflecting sheet arranged on a bottom surface side opposing an emitting surface of the light guide plate, and a fixation device for fixing the reflecting sheet to a bottom surface of the housing frame, wherein the recesses of the housing frame include a first recess which is formed to be opened at a bottom surface side and is at least partially covered by the fixation device, and each of the protrusions to be arranged at the first recess has an opposing surface that opposes the fixation device, and the opposing surface is provided with clearance relative to the fixation means.

With this structure, among projections provided on the side surface of the light guide plate, the projection arranged at the first recess has the opposing surface that opposes the fixation device. Since 1) the projection is provided with clearance relative to the fixation device, 2) the first recess is formed to be opened at the bottom surface side thereof, and 3) the first recess is at least partially covered by the fixation device, the protrusion arranged in the first recess will be free from restraint to the reflecting sheet and the housing frame due to the fixation device. Thereby, when environmental changes, for example, temperature changes occur, the stress on the protrusions is reduced, and cracks or fissures in the protrusions are suppressed or eliminated.

According to the first aspect of the present invention, the protrusion arranged at the first recess has the opposing surface that opposes the fixation device, the opposing surface being configured to have an inclined surface part that comes closer to an emitting surface side of the light guide plate as moving toward the outside when setting a height position of a bottom surface of the light guide plate as a base point.

With this structure, it is possible to maximize the cross-section area of the root portion of the protrusion arranged at the first recess, whereby cracks or fissures in the protrusions can be thus more effectively suppressed or eliminated.

According to the first aspect of the present invention, the fixation device is a double-sided tape.

According to the first aspect of the present invention, the protrusion arranged at the first recess has a trapezoidal shape in a plan view, the shape being configured to have width decreasing toward the outside.

With this structure, cracks or fissures in the protrusions can be effectively suppressed or eliminated regardless of stress applied to the protrusion arranged at the first recess.

According to the first aspect of the present invention, the protrusion arranged at the first recess has a boundary portion relative to a side surface of the light guide plate, the boundary portion being formed into an R shape.

With this structure, cracks or fissures in the protrusions can be effectively suppressed or eliminated even if the protrusion disposed in the first recess is subjected to stress.

According to the first aspect of the present invention, the protrusion arranged at the first recess is formed relatively at a bottom surface side of the light guide plate, and the first recess is configured to have a step while maintaining a wall part, which is placed relatively at a top surface side of the housing frame.

With this structure, a method in which the light guide plate is disposed from the bottom surface side of the housing frame and then the reflecting sheet is fixed via the fixation device to the bottom surface of the housing frame can be suitably applied to the assembly of the spread illuminating apparatus.

According to a second aspect of the present invention, there is provided a spread illuminating apparatus comprising: a light guide plate having a flat surface that emits light, and a frame-shaped housing frame that retains the light guide plate, wherein the light guide plate has protrusions on side surfaces of the light guide plate for being positioned in the housing frame, and the protrusions include a first protrusion having a portion where the thickness decreases toward the outside.

With this structure, the first protrusion on the side surface of the light guide plate has a portion configured such that the thickness decreases toward the outside. Therefore, even if environmental changes, for example, temperature changes occur, or some kind of external forces are applied to the protrusions, concentration of stress on the root portion of the first protrusion is alleviated. Cracks and fissures of the first protrusion can be thus suppressed or eliminated.

Further, with this structure, in the case that the light guide plate is molded by injection molding of a molten resin, residual stress generated at the root portion of the first protrusion can be reduced by decreasing the volume of the first protrusion, and this provides a further advantage in suppressing or eliminating cracks or fissures in the first protrusion.

With the structures described hereinabove, the present invention can provide a spread illuminating apparatus that has a structure in which a light guide plate is housed in a housing frame and can suppress cracks or fissures in the protrusions of the light guide plate.

DETAILED DESCRIPTION OF THE PREFERRED EMBODIMENTS

Embodiments of the present invention will be explained below referring to the attached drawings. The drawings (FIGS. 1 to 4) all or partially illustrating a spread illuminating apparatus are schematic views which emphasize the features for the sake of explanation, and the relative dimension for each portion illustrated therein does not mean actual scales.

Figure 1:
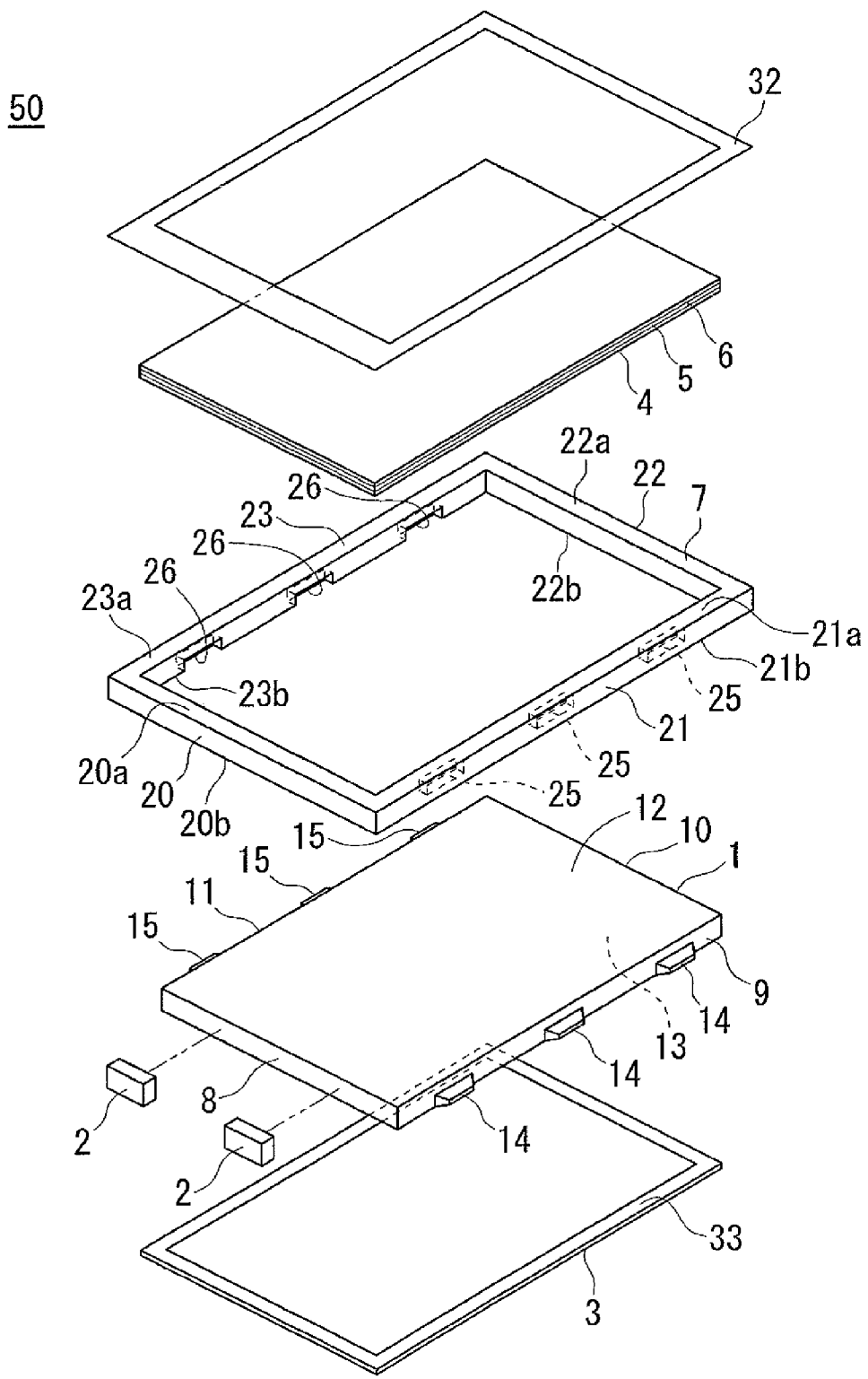
FIG. 1 is a breakdown perspective view illustrating the essential parts of a spread illuminating apparatus according to one embodiment of the present invention.

FIG. 1 is a breakdown perspective view illustrating the essential parts of a spread illuminating apparatus according to one embodiment of the present invention.

A spread illuminating apparatus 50 shown in FIG. 1 is used as a backlight of a liquid crystal panel, and includes a light guide plate 1, light sources 2, a reflecting sheet 3, a diffusing sheet 4, prism sheets 5 and 6, and a frame-shaped housing frame 7 in which these members are housed and retained.

The light guide plate 1 is a plate-shaped light guide plate made by injection molding or the like from a transparent resin material such as a methacrylic resin or a polycarbonate resin. In the spread illuminating apparatus 50, the light guide plate 1 is molded into an approximate rectangle shape in a plan view, and point light sources 2 are disposed on one (in the illustrated example, the side surface 8; hereinafter, this side surface will also be referred to as the incident surface) among the four side surfaces 8 to 11.

Protrusions 14 and 15 that protrude respectively from side surfaces 9 and 11 are provided on the side surfaces 9 and 11 which intersect and extend (in this case, in an orthogonal direction) from the incident surface 8 of the light guide plate 1. To be explained later, the protrusions 14 and 15 are used for positioning of the light guide plate 1 relative to the housing frame 7 when housing the light guide plate 1 in the housing frame 7.

In the spread illuminating apparatus 50, as shown in FIG. 1, the light sources 2 can be constituted by a plurality of point light sources (for example, white light-emitting diodes) arranged along the incident surface 8.

In the spread illuminating apparatus 50, light emitted from the light sources 2 enters into the light guide plate 1 through the incident surface 8, and is emitted in a spread manner from one principal surface 12 (or a predetermined effective emitting area set within the principal surface 12) of the light guide plate 1. Hereinafter, the principal surface 12 will also be referred to as the emitting surface, and a principal surface 13 on the opposite side of the principal surface 12 will also be referred to as the bottom surface.

The housing frame 7 is molded in a frame shape having side walls 20 to 23 from a resin material obtained by mixing a light-reflecting member (for example, a white pigment such as titanium oxide) into, for example, a polycarbonate resin.

The light guide plate 1 is housed within the housing frame 7 so that the side surfaces 8 to 11 are surrounded by the side walls 20 to 23.

Among the side walls 20 to 23 of the housing frame 7, the side walls 21 and 23 that oppose the side surfaces 9 to 11 when the light guide plate 1 is housed within the housing frame 7 are respectively provided with recesses 25 and 26. The light guide plate 1 is positioned relative to the housing frame 7 by disposing the protrusions 14 and 15 into the recesses 25 and 26.

Further, in the spread illuminating apparatus 50, a diffusing sheet 4 and prism sheets 5 and 6 are laminated on the emitting surface 12 side of the light guide plate 1, and then a frame-shaped light-blocking sheet 32 is arranged to cover the periphery of the prism sheet 6 which is the uppermost layer and adhered to the prism sheet 6 and top surfaces (surfaces on the emitting surface 12 side of the light guide plate 1) 20a to 23a of the side walls 20 to 23 of the housing frame 7. A region within the emitting surface 12 of the light guide plate 1 that corresponds to the inside of the frame of the light-blocking sheet 32 corresponds to the above-mentioned effective emitting area.

A reflecting sheet 3 is disposed on the bottom surface 13 side of the light guide plate 1. The reflecting sheet 3 is retained on the housing frame 7 by adhering the peripheral edges of the reflecting sheet 3 to bottom surfaces 20b to 23b of the side walls 20 to 23 of the housing frame 7 via an adhering means such as a double-sided tape 33.

In the spread illuminating apparatus 50, the reflecting sheet 3, the diffusing sheet 4, and the prism sheets 5 and 6 can all use well-known members that are utilized in a spread illuminating apparatus, and thus a detailed explanation of the structures thereof will not be made.

In the example shown in FIG. 1, when the light guide plate 1 is positioned at a predetermined location for being housed in the housing frame 7, a gap is created between the side wall 20 that opposes the incident surface 8 of the light guide plate 1 and the incident surface 8. The light sources 2 are accommodated in this gap (for example, in a state where the light sources 2 are mounted on a circuit board such as an FPC, which is not illustrated).

Figure 2:
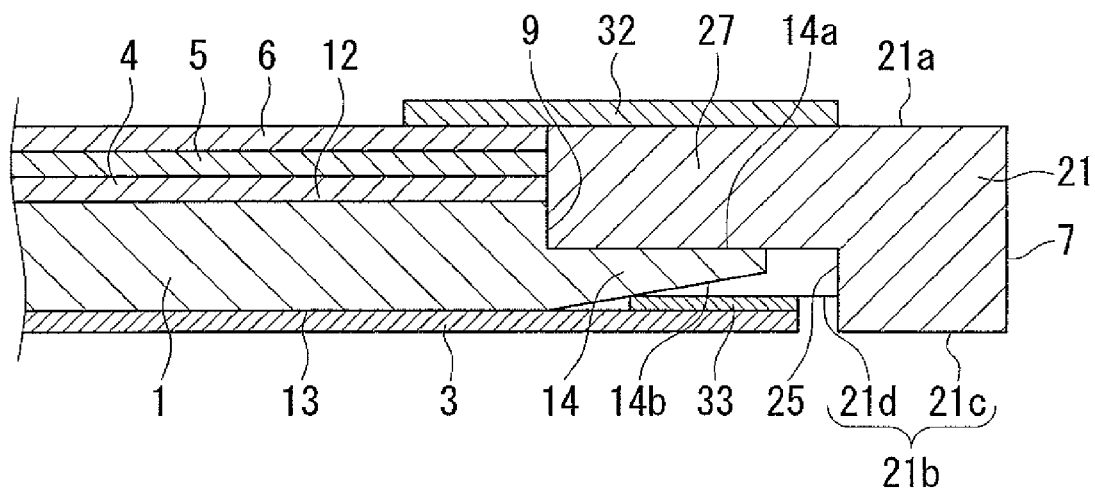
FIG. 2 is a partial cross-section view illustrating the structure in the vicinity of a protrusion of a light guide plate in the spread illuminating apparatus shown in FIG. 1.
Figure 3:
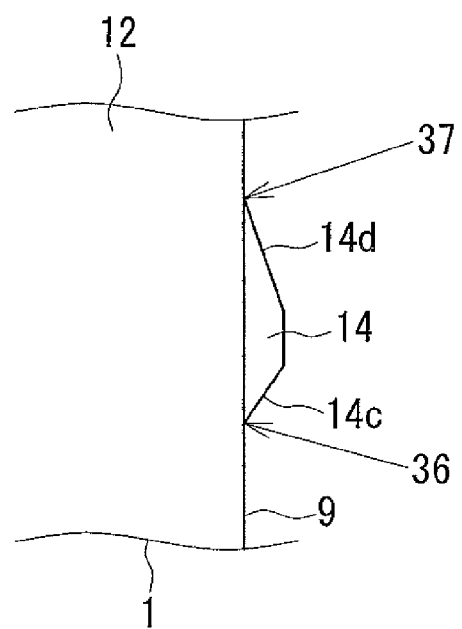
FIG. 3 is a plan view illustrating one example of the shape of the protrusion of the light guide plate in the spread illuminating apparatus according to one embodiment of the present invention.
Figure 4:
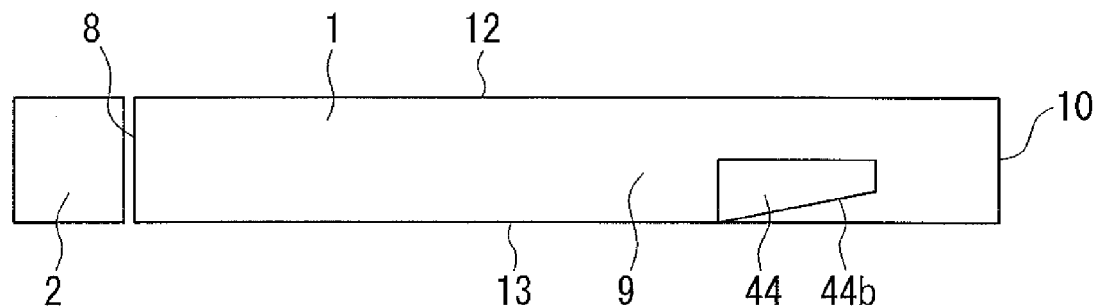
FIG. 4 is a side surface view illustrating another example of the shape of the protrusion of the light guide plate in the spread illuminating apparatus according to one embodiment of the present invention.

Next, referring to FIG. 1 and FIGS. 2 and 3, the structures of the protrusions 14 and 15 and the recesses 25 and 26 in the spread illuminating apparatus 50 will be explained in detail. Here, FIG. 2 is a partial cross-section view illustrating the vicinity of one protrusion 14 of the light guide plate 1 in the spread illuminating apparatus 50 in an assembled state at a cross-section that is orthogonal in an extended direction of the side surface 9 through the protrusion 14. FIG. 3 is a plan view of the one protrusion 14 when viewed from the emitting surface 12 side of the light guide plate 1.

The structures of the one protrusion 14 and one recess 25 shown in FIGS. 2 and 3 will be explained hereinbelow as an example. The structures of the other protrusions 14 and 15 and the recesses 25 and 26 in the spread illuminating apparatus 50 are identical to the ones shown in FIGS. 2 and 3.

In FIG. 2, a step for the reflecting sheet 3 to be introduced is provided between an outer edge part 21c and an inner edge part 21d of the bottom surface 21b of the side wall 21. This step is not however illustrated in FIG. 1.

In the spread illuminating apparatus 50, the protrusion 14 is formed relatively at the bottom surface 13 side in a thickness direction of the light guide plate 1. Specifically, a top surface (surface on the emitting surface 12 side of the light guide plate 1) 14a of the protrusion 14 is constituted by a flat surface that extends approximately parallel to the emitting surface 12 from near the center in a thickness direction of the side surface 9, and a bottom surface (surface on the bottom surface 13 side of the light guide plate 1) 14b of the protrusion 14 is constituted by an inclined surface that is inclined so that the surface comes closer to the emitting surface 12 side as moving toward the outside when setting the height of the bottom surface 13 of the light guide plate 1 as a base point. Thus, the thickness of the protrusion 14 decreases toward the outside due to the structures of the top and bottom surfaces 14a and 14b as described hereinabove.

The recess 25 in which the protrusion 14 is introduced is formed on an inner surface (surface opposing the side surface 9 of the light guide plate 1) of the side wall 21 of the housing frame 7 in a step configuration which is opened at the bottom surface 21b side of the side wall 21 and is closed at a top surface 21a side while maintaining a wall part 27 relatively at the top surface 21a side. In a state that the reflecting sheet 3 is retained on the housing frame 7, a portion of the recess 25 is covered by the double-sided tape 33 for adhering the peripheral edges of the reflecting sheet 3 to the bottom surface 21b (an inner edge part 21d in the illustrated example) of the side wall 21.

In the assembled state of the spread illuminating apparatus 50, the protrusion 14 is placed within the recess 25 while the top surface 14a of the protrusion 14 is in contact with the wall part 27 of the housing frame 7. At this time, the bottom surface 14b of the protrusion 14, which is an opposing surface that opposes the double-sided tape 33, is provided with clearance relative to the double-sided tape 33.

Here, The shape of the protrusion 14 in a plan view is preferably a trapezoidal shape whose width decreases toward the outside as shown in FIG. 3. In other words, the protrusion 14 is formed into a trapezoidal shape in which, when the root side (side surface 9 side of the light guide plate 1) is the lower base and the distal end side is the upper base, the upper base is shorter than the lower base. Further preferably, the protrusion 14 is formed so that boundary portions 36 and 37 between the protrusion 14 and the side surface 9 of the light guide plate 1 are an R shape (not illustrated).

The spread illuminating apparatus 50 achieves the following operational effects due to the structure described above. First, in the spread illuminating apparatus 50, the bottom surface 14b of the protrusion 14 that opposes the double-sided tape 33 and a bottom surface (not illustrated, but assigned reference numeral 15b below) of the protrusion 15 that opposes the double-sided tape 33 are both provided with clearance relative to the double-sided tape 33. Thereby, the protrusions 14 and 15 arranged at the recesses 25 and 26 are not restrained to the reflecting sheet 3 and the housing frame 7 by the double-sided tape 33, and thus the stress on the protrusions 14 and 15 can be reduced even if environment changes such as temperature changes occur. Therefore, cracks or fissures in the protrusions 14 and 15 can be suppressed or eliminated.

Further, in the spread illuminating apparatus 50, in order to arrange the bottom surfaces 14b and 15b of the protrusions 14 and 15 with clearance relative to the double-sided tape 33, the bottom surfaces 14b and 15b are formed with inclined surfaces that come closer to the emitting surface 12 side of the light guide plate 1 as shifting toward the outside when setting the height position of the bottom surface 13 of the light guide plate 1 as a base point. With this structure, the cross-section area of the root portions of the protrusions 14 and 15 can be maximized while separating the bottom surfaces 14b and 15b of the protrusions 14 and 15 from the double-sided tape 33. Further, the negative effects of restraint by the double-sided tape 33 can be avoided while maintaining the strength of the root portions of the protrusions 14 and 15, and thus cracks and fissures in the protrusions can be more effectively suppressed or eliminated.

In the example shown in FIG. 2, the bottom surface 14b of the protrusion 14 is formed with a surface, which entirely inclines at a constant angle. However, the protrusions 14 and 15 may have the bottom surfaces 14b and 15b partially inclined and come closer to the emitting surface 12 side of the light guide plate 1 as moving toward the outside when setting the height position of the bottom surface 13 of the light guide plate 1 as a base point. Further, the bottom surfaces 14b and 15b may have a curved surface.

In the spread illuminating apparatus 50, the protrusions 14 and 15 are each formed to have thickness that decreases as moving toward the outside. Thus, even if external forces occur based on a factor not derived from restraint through the adhesion of the double-sided tape 33 and act on the protrusions 14 and 15, concentration of stress on the root portions of the protrusions 14 and 15 is alleviated, and cracks and fissures in the protrusions 14 and 15 can be suppressed or eliminated.

Further, as explained hereinabove, the protrusions 14 and 15 are configured to have thickness that decreases as moving toward the outside. This contributes to not only suppressing or eliminating cracks or fissures in the protrusions 14 and 15. But, in the case that the light guide plate 1 is molded by injection molding of a molten resin, residual stress generated at the root portions of the protrusions 14 and 15 can be reduced due to decrease of the volume of the protrusions 14 and 15 formed integrally with the light guide plate 1.

In the spread illuminating apparatus 50, all of the protrusions 14 and 15 are configured to have thickness that decreases as moving toward the outside in a protruding direction. However, the protrusions 14 and 15 may have thickness only partially decreasing toward the outside in a protruding direction.

Moreover, a structure in which the shape in a plan view of the protrusions 14 and 15 is a trapezoidal shape whose width decreases toward the outside, and a structure in which the boundary portions 36 and 37 of the protrusions 14 and 15 with the side surface 9 of the light guide plate 1 form an R shape are further advantageous with respect to suppressing or eliminating cracks or fissures in the protrusion 14 because even if stress acts on the protrusion 14, concentration of stress on the root portion of the protrusion 14 is alleviated.

Here, the inclination angles of inclined surfaces 14c and 14d in the trapezoidal shape are properly determined by considering influence of the inclined surfaces 14c and 14d in the optical characteristics of the spread illuminating apparatus and moldability of the protrusion 14 and 15 portions of the light guide plate 1.

In the spread illuminating apparatus 50, the protrusions 14 and 15 are provided relatively at the bottom surface 13 side of the light guide plate 1, and the recesses 25 and 26 in which the protrusions 14 and 15 are disposed are formed in a step toward the top surfaces 21a and 23a of the housing frame 7 while maintaining the wall parts 27. Therefore, during assembly of the spread illuminating apparatus 50, the following method can be suitably applied: after preparing the housing frame 7 by turning it over, the light guide plate 1 is placed within the housing frame 7 from the bottom surfaces 20b to 23b side of the housing frame 7, and then the reflecting sheet 3 is fixed via the double-sided tape 33 to the bottom surfaces 20b to 23b of the housing frame 7.

In FIG. 1, the reflecting sheet 3 is illustrated in a state that the double-sided tape 33 is placed on the peripheral edges of the reflecting sheet 3. However, this is for the sake of explanation purpose, and does not suggest that the actual assembly process of the spread illuminating apparatus 50 must be carried out by a procedure in which the double-sided tape 33 is adhered in advance onto the reflecting sheet 3 and then the reflecting sheet 3 is fixed to the housing frame 7.

Figure 6:
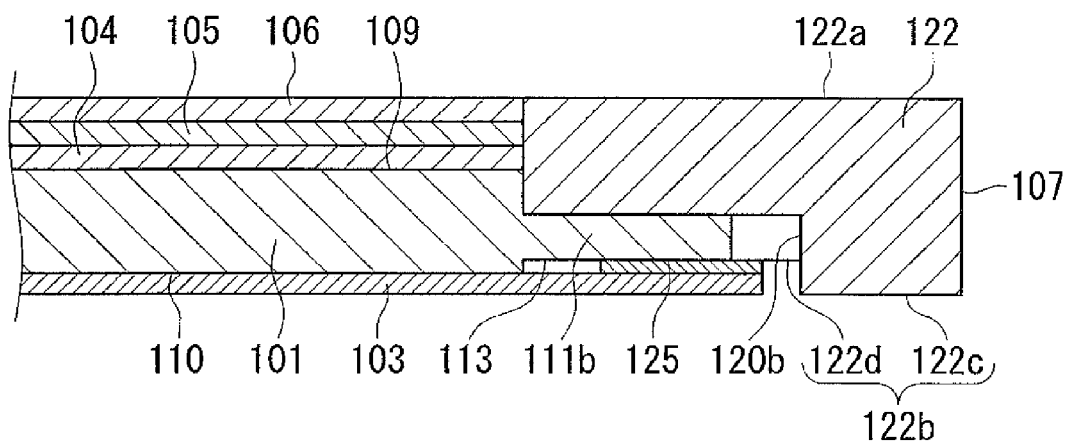
FIG. 6 is a partial cross-section view illustrating the structure in the vicinity of a protrusion of a light guide plate in the spread illuminating apparatus shown in FIG. 5.

Through investigation conducted by the present inventors, five samples each of the conventional spread illuminating apparatus having the protrusions 111b that are adhered to the double-sided tape 125 as shown in FIG. 6 and the spread illuminating apparatus 50 according to the embodiment of the present invention were subjected to a temperature cycle test (−40° C. to +85° C., 600 cycles). In the conventional spread illuminating apparatus, cracks in the protrusions 111b were found in all of the samples. On the other hand, in the spread illuminating apparatus 50 according to the embodiment of the present invention, it was confirmed that no cracks in the protrusions 14 and 15 were found in any of the samples.

The present invention has been explained hereinabove based on preferred embodiments, but the spread illuminating apparatus according to the present invention is not limited thereto. For example, the protrusions arranged at the recesses 25 and 26, which are formed on the side walls 21 and 23 of the housing frame 7 to be opened at the bottom surfaces 21b and 23b side of the side walls 21 and 23 and are partially covered by the double-sided tape 33, may be formed like the protrusion 44 shown in FIG. 4. That is, the bottom surface 44b is an inclined surface 44b that inclines so as to approach the emitting surface 12 side as moving from the incident surface 8 side toward the side surface 10 side opposing the incident surface 8 (or an inclined surface that is inclined so that it approaches the emitting surface 12 heading from the side surface 10 side that opposes the incident surface 8 toward the incident surface 8 side). The bottom surface 44b is thus provided with clearance relative to the double-sided tape 33.

The protrusions, arranged at the recesses 25 and 26, formed on the side walls 21 and 23 of the housing frame 7 to be opened at the bottom surfaces 21b and 23b side of the side walls 21 and 23, and are partially covered by the double-sided tape 33, do not necessarily have to be formed relatively at the bottom surface 13 side in a thickness direction of the light guide plate 1. The protrusions may be instead formed approximately flush with the emitting surface 12 of the light guide plate 1.

In the spread illuminating apparatus according to the present invention, the recesses provided on the side walls 21 and 23 of the housing frame 7 may include recesses structurally differs from the recesses 25 and 26 (first recesses) that are formed to be opened at the bottom surfaces 21b and 23b side of the side walls 21 and 23 and are partially covered by the double-sided tape 33. Also, the protrusions for positioning on the side surfaces 9 and 11 of the light guide plate 1 may include protrusions disposed in the above recesses different from the first recesses 25 and 26.

Figure 5:
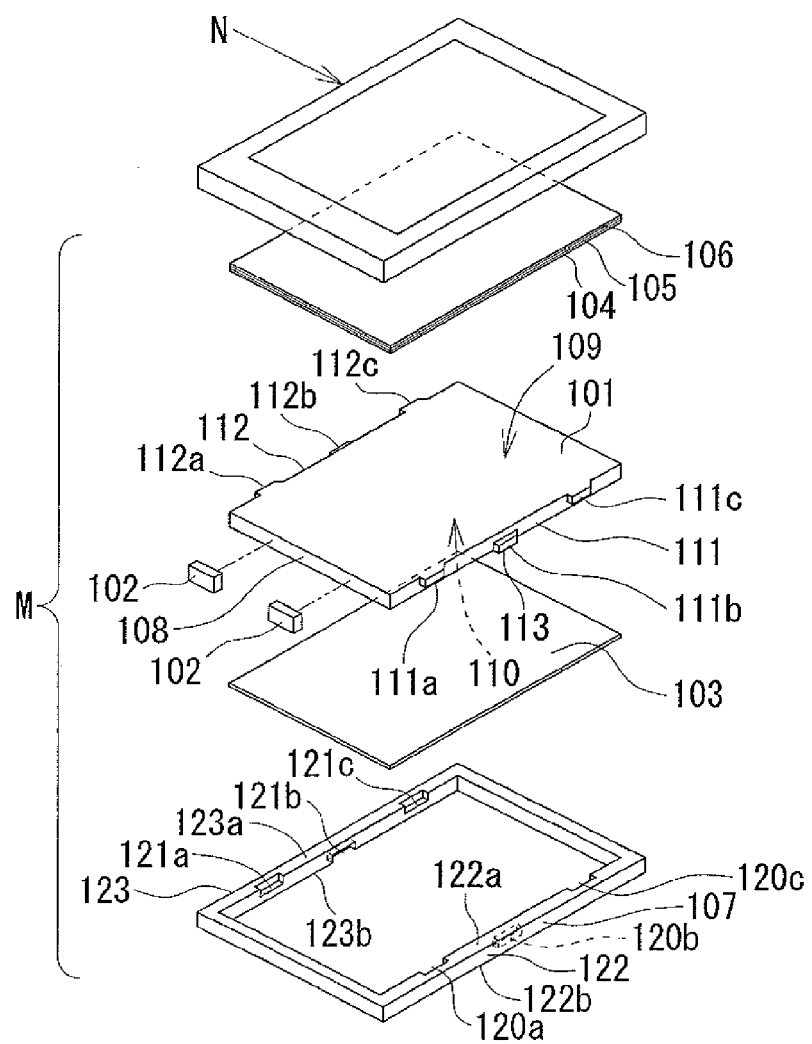
FIG. 5 is a breakdown perspective view illustrating a structural example of a conventional spread illuminating apparatus.

In a typical example, the recesses provided on the side walls 21 and 23 of the housing frame 7 include recesses that are opened at the top surfaces 21a and 23a side of the side walls 21 and 23 (and not opened at the bottom surfaces 21b and 23b side) like the recesses 120a, 120c, 121a, and 121c shown in FIG. 5. Further, the protrusions on the side surfaces 9 and 11 of the light guide plate 1 that are arranged at the above recesses include protrusions provided relatively at the emitting surface 12 side in a thickness direction of the light guide plate 1 like the protrusions 111a, 111c, 112a, and 112c shown in FIG. 5.

Further, in the spread illuminating apparatus 50, the recesses 25 are configured as shown in FIG. 2 as that they are partially covered by the double-sided tape 33 and gaps exist on the outer edge part 21c side of the bottom surface 21b of the side wall 21 and the side surface 9 side of the light guide plate 1. In the spread illuminating apparatus of the present invention, however, all of the first recesses 25 and 26 may be covered with the fixation device, for example, the double-sided tape 33.

The spread illuminating apparatus 50 has the protrusions 14 and 15 provided on the side surfaces 9 and 11 which intersect and extend from the incident surface 8 of the light guide plate 1. However, in the spread illuminating apparatus according to the present invention, the protrusions 14 and 15 arranged at the first recesses 25 and 26 or any other protrusions (if they exist) may be provided on an arbitrary side surface of the light guide plate.

What is claimed is:

1. A spread illuminating apparatus comprising:
a light guide plate having protrusions on side surfaces of the light guide plate,
a housing frame having recesses in which the protrusions of the light guide plate are introduced,
a reflecting sheet arranged on a bottom surface side opposing an emitting surface of the light guide plate, and
a fixation device for fixing the reflecting sheet to a bottom surface of the housing frame,
wherein the recesses of the housing frame include a first recess which is formed to be opened at a bottom surface side and is at least partially covered by the fixation device, and each of the protrusions to be arranged at the first recess has an opposing surface that opposes the fixation device, and the opposing surface is provided with clearance relative to the fixation device.

2. The spread illuminating apparatus according to claim 1, wherein the protrusion arranged at the first recess has the opposing surface that opposes the fixation device, the opposing surface being configured to have an inclined surface part that comes closer to an emitting surface side of the light guide plate as moving toward the outside when setting a height position of a bottom surface of the light guide plate as a base point.

3. The spread illuminating apparatus according to claim 1, wherein the fixation device is a double-sided tape.

4. The spread illuminating apparatus according to claim 1, wherein the protrusion arranged at the first recess has a trapezoidal shape in a plan view, the shape being configured to have a width decreasing toward the outside.

5. The spread illuminating apparatus according to claim 1, wherein the protrusion arranged at the first recess has a boundary portion relative to a side surface of the light guide plate, the boundary portion being formed into an R shape.

6. The spread illuminating apparatus according to claim 1, wherein the protrusion arranged at the first recess is formed relatively at a bottom surface side of the light guide plate, and the first recess is configured to have a step while maintaining a wall part, which is placed relatively at a top surface side of the housing frame.

* * * * *